Sept. 11, 1934.　　　　　A. J. MASON　　　　　1,973,439
RECOVERY OF PHOSPHATES FROM MINERALS
Filed June 20, 1930　　　6 Sheets-Sheet 1
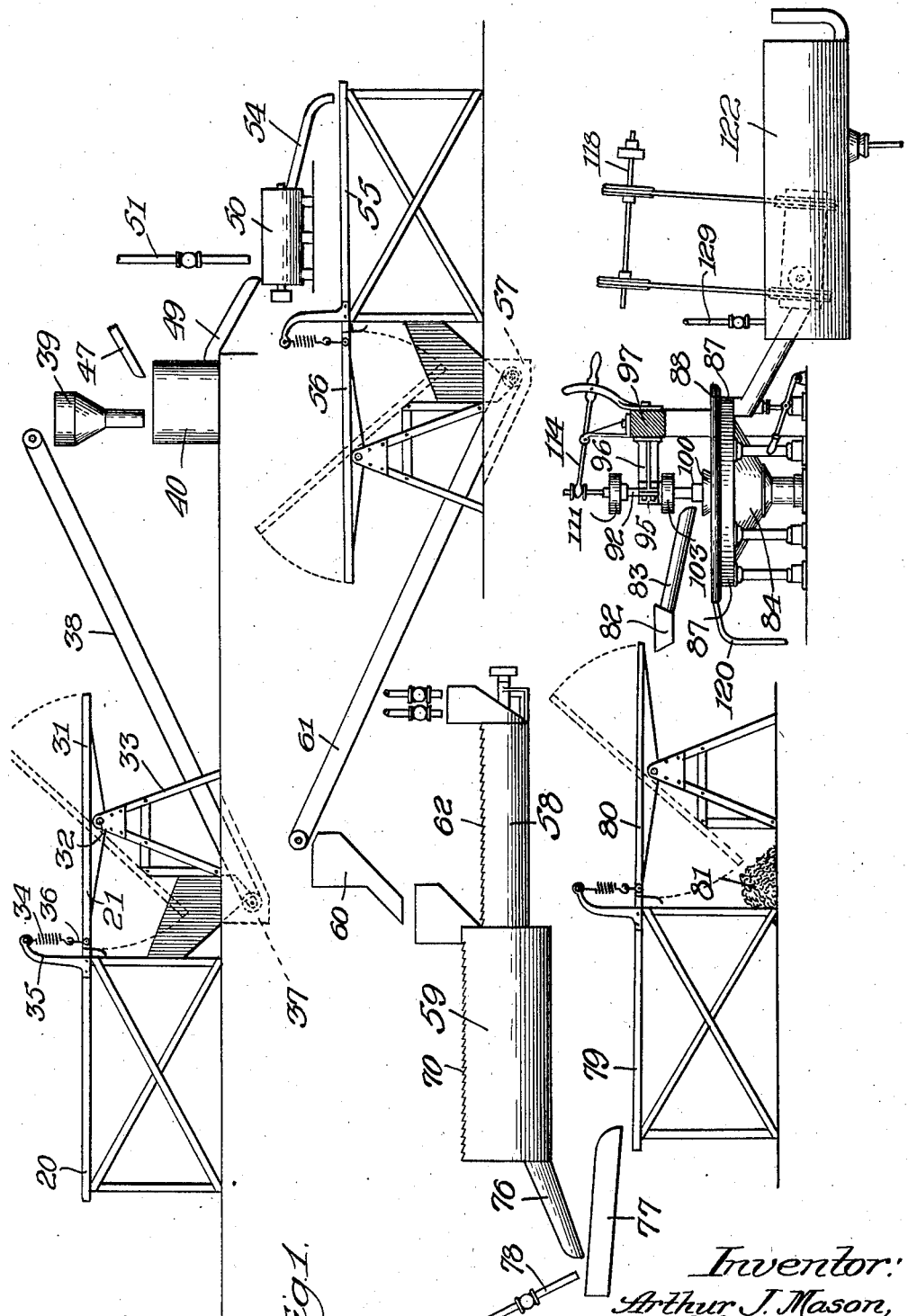

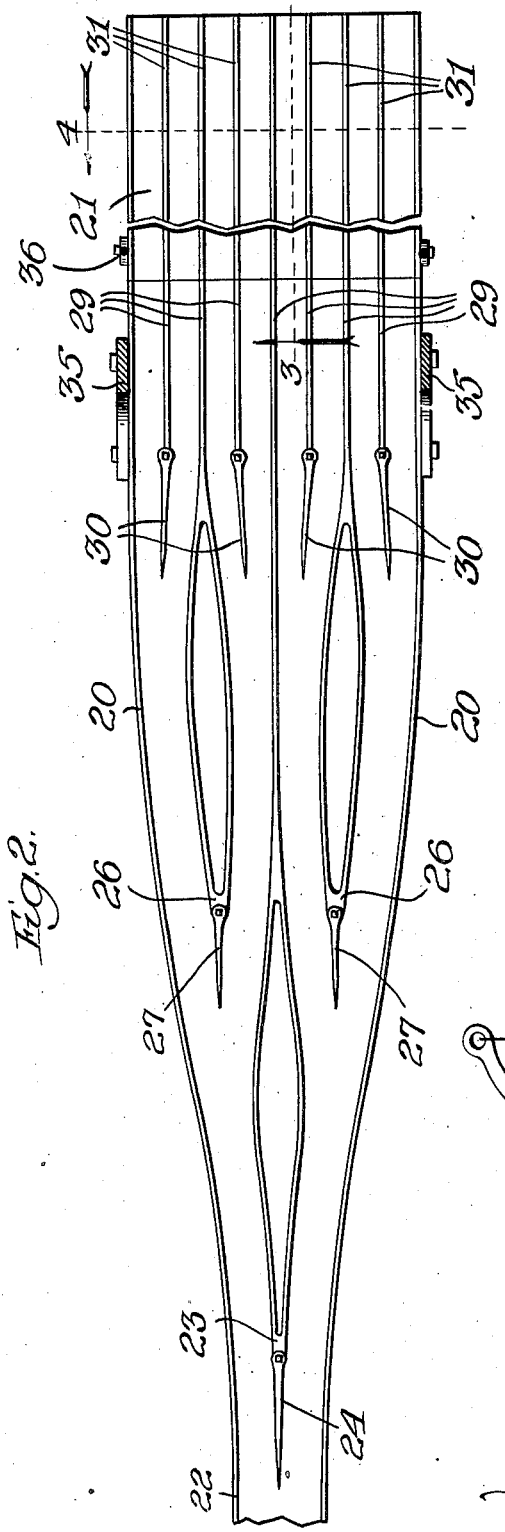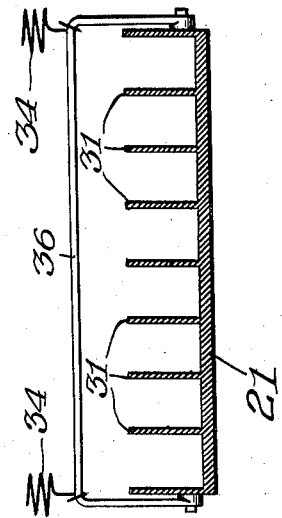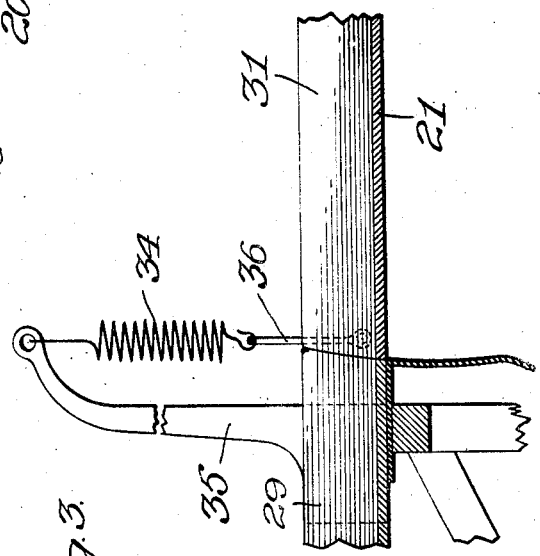

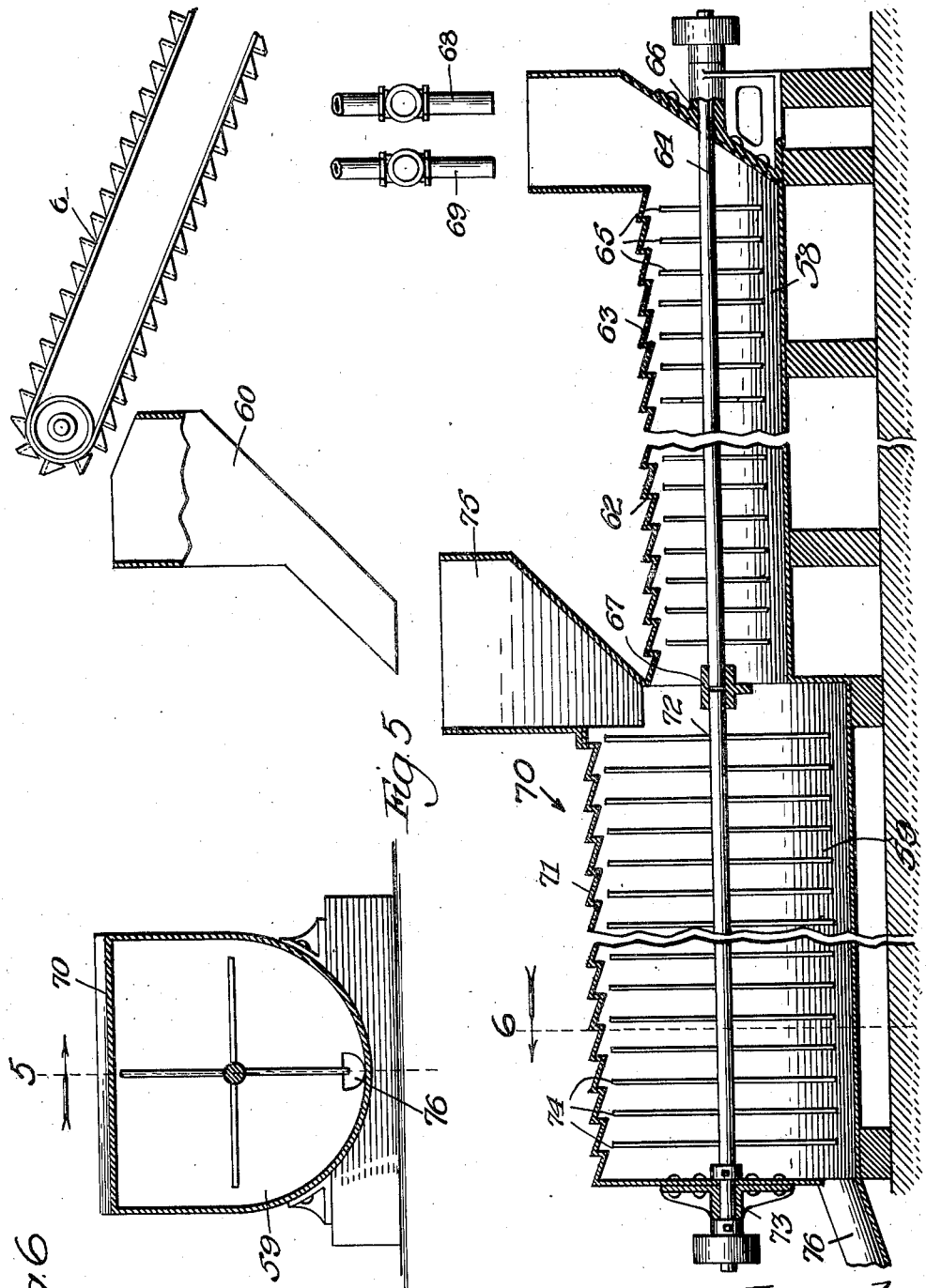

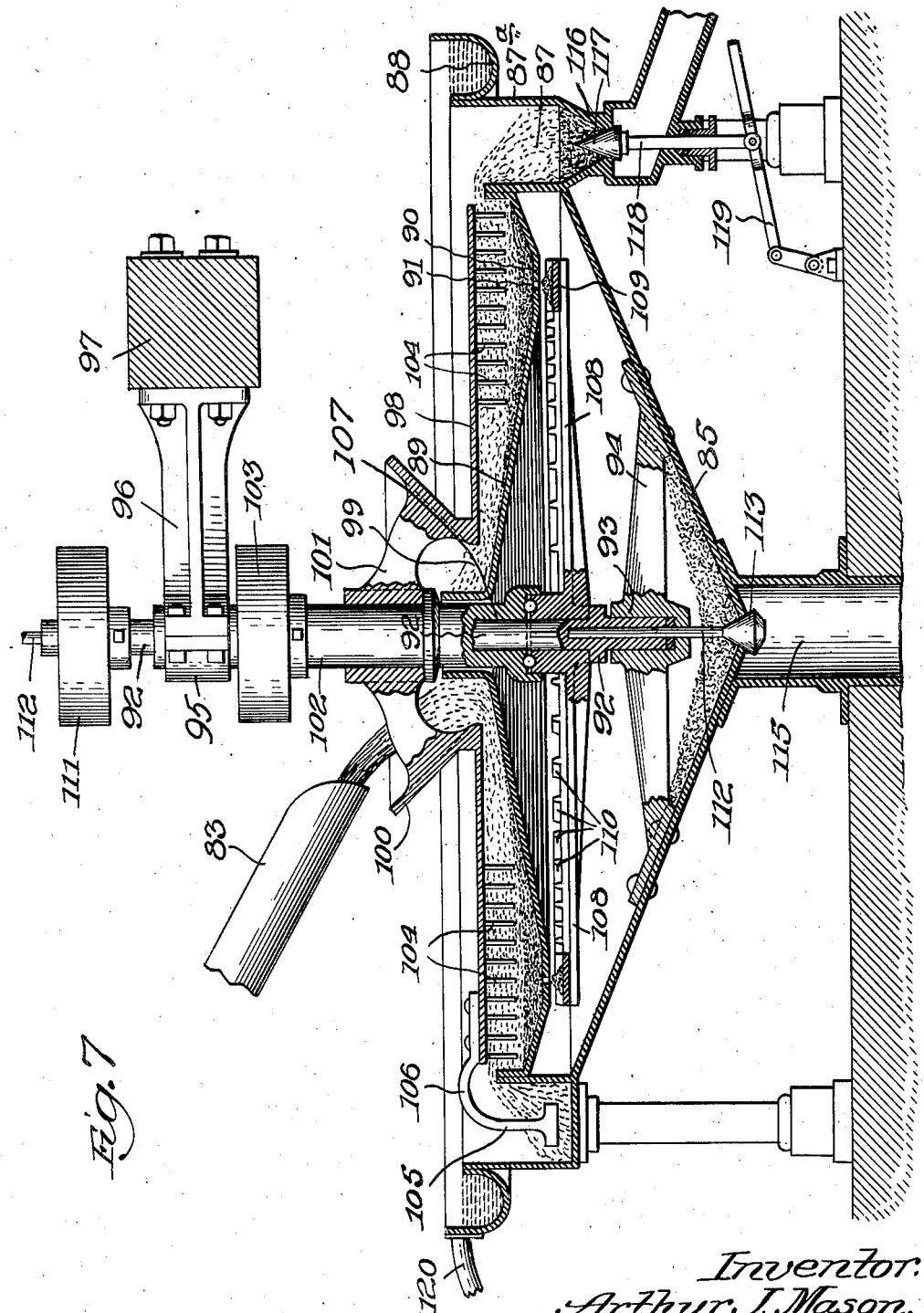

Sept. 11, 1934.                A. J. MASON                1,973,439
                    RECOVERY OF PHOSPHATES FROM MINERALS
                        Filed June 20, 1930        6 Sheets-Sheet 5

Inventor:
Arthur J. Mason,
By Dyrenforth, Lee, Chritton & Wiles,
Attys.

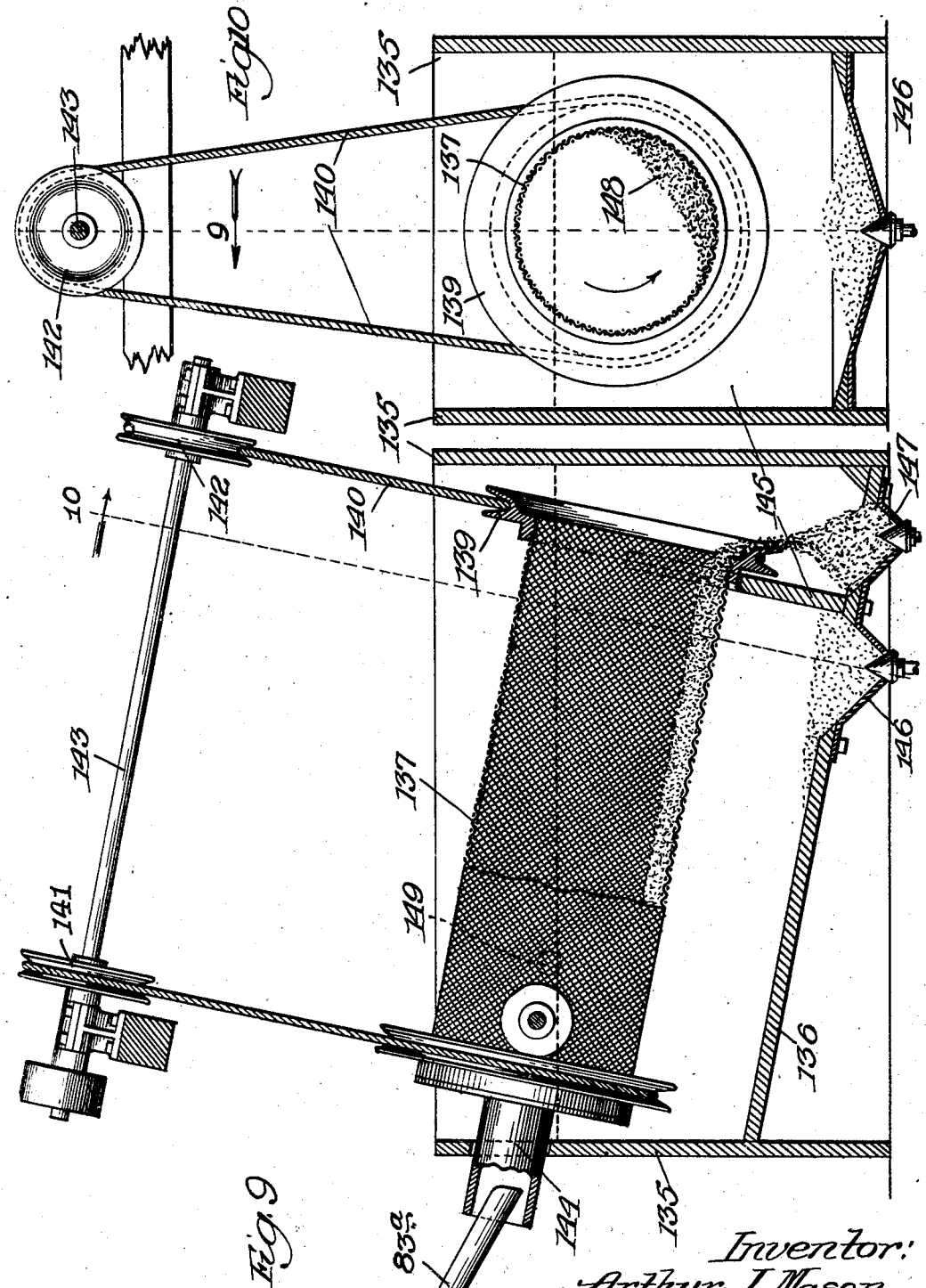

Patented Sept. 11, 1934

1,973,439

UNITED STATES PATENT OFFICE 1,973,439

RECOVERY OF PHOSPHATES FROM MINERALS

Arthur J. Mason, Homewood, Ill.; Continental Illinois National Bank and Trust Company of Chicago, executor of said Arthur J. Mason, deceased Application June 20, 1930, Serial No. 462,539

6 Claims. (Cl. 209—49)

The present invention relates to the recovery of phosphates from minerals, and more particularly to the concentration and recovery of the phosphate values from the "sands" or fine material now discarded as the waste from the usual processes of washing phosphate rock, for example, in Florida.

In a customary procedure now employed for preparing phosphate rock, for example, for acid treatment, the excavated rock is washed and screened, the granular material not passing through a screen of a certain size of mesh, say a one-sixteenth inch to one-twentieth inch mesh, is recovered as the valuable phosphate material, the finer materials or sands passing through the screens being discarded as debris. These waste sands may contain from 20 to 40% of phosphate of lime (designated B. P. L.) on an anhydrous basis. It is the purpose of the present invention to accomplish the concentration and separation of the valuable phosphate material contained in such waste material and to isolate therefrom the silica sand.

In carrying out the present invention, for example, in the treatment of the stream of debris discharged from an ordinary phosphate washing and screening operation, I first separate, as hereinafter more fully set forth, fine, phosphate-containing material or sands preferably by deposition from a shallow carrying stream of water, for example, by the apparatus illustrated in my prior Patent No. 1,723,190, granted August 6, 1929. I then subject the separated sands to a rubbing or attrition process, thereby loosening and permitting separation of adherent clay-like material, which is apparently present as a paint-like coating on the particles. This has as a primary purpose the cleaning of the material, and thereby to minimize the amount of chemicals employed in the subsequent separation, as hereinafter described. In this and in all operations in accordance with this invention, grinding or any action resulting in excessive fineness of the material is avoided, to avoid interfering with the settling or sedimentation of the material in water. After the rubbing or attrition operation, such material is separated as a slimy material from the apparently clean sands on washing. Such washing may be effected and the cleaned particles isolated in a manner similar to the first separation of the material, as by the use of the apparatus of my Patent No. 1,723,190 above referred to.

I then thoroughly incorporate with the cleaned material a minute proportion of an oil, preferably a heavy bituminous oil such as a heavy petroleum tar or fuel oil, preferably with the aid of a small amount of soap or other emulsifying agent. I have discovered that the proportion of oil incorporated should be such as to secure a selective and aggregative action on the phosphate particles without producing a tendency to float. If the oil-treated material is now caused to flow in a shallow stream of water, as in a flume-like separator such as is shown in my patent above referred to, a wholly novel phenomenon appears and silica present in the material separates and packs along the bottom of the flume forming a beach-like mass, and the phosphatic material rolls along the surface of the beach-like or packed mass of sand at the bottom of the moving stream of water. If, in certain cases, more particularly with finer sand or after removal of the coarser portion of the silica present, the oil-treated material is moved under water on a screen of suitable fineness of mesh, for example, a rotating screen, I find that the silica of the material finds its way downwardly through the mass, accumulating and packing below the phosphatic constituents and passing through the screen while the phosphatic constituents may be carried along over the screen, apparently on the packed silica. This occurs even though the phosphatic constituents are fine enough to pass through the screen when dry.

The differences in characteristics of the constituents of the oil-treated material may be utilized in other manners. For example, I have found that, on stirring a mass of such material under water with fine stirring arms or pins, a stratified sedimentation occurs, the silica passing through the mass to the bottom and the phosphatic constituents settling on the surface of the accumulated silica.

I have thus discovered that the constituents of the oil-treated material have different mobilities and tendencies to pack under water, the silica content thereof depositing and packing, somewhat like the sand of a wet beach, and the phosphate constituents, with greater mobility and less tendency to pack, depositing on the silica stratum, and tending to move or roll on it with motion of the water. I have discovered that the silica of the material can be separated from the phosphates, this being effected in one or more stages, depending upon the completeness with which the separation is to be made. The separated phosphatic material may then be treated to remove the admixed oily material, which may be reused, while the phosphates are subjected to any desired further treatment, for example, to chemical treatment for recovery of phosphoric acid or to a volatilization process for recovery of phosphorus. Throughout the operations in accordance with my invention, I avoid anything, such as excessive fineness of material, grinding, use of excessive oil or emulsifying agent or too vigorous agitation, which will tend to bring any constituents of the material treated to the surface of the water carrying it and cause loss by flotation thereupon.

The present invention will be fully understood from the following description of details of specific procedure in carrying it into effect, illustrated by the accompanying drawings, in which:

Figure 1 is a diagrammatic view, showing schematically the flow of materials in an operation embodying the present invention;

Fig. 2 is a broken plan view of a distributing table and settling or flume table, as utilized in the separation of the fine debris or sands from the stream of water carrying it;

Fig. 3 is a broken sectional view longitudinally of the settling or flume table on the line 3 of Fig. 2;

Fig. 4 is a transverse sectional view on the line 4 of Fig. 2;

Fig. 5 is a longitudinal sectional view through an emulsifier and mixer for admixing with the treated sands a suitable proportion of a prepared emulsion of oil;

Fig. 6 is a transverse sectional view on the line 6 of Fig. 5;

Fig. 7 is a vertical sectional view through a separating device for separating the constituents of the phosphatic debris;

Fig. 9 is an elevation, partly in section, of an optional form of separating device for use in separating the phosphatic and silicious constituents of the phosphate debris; and Fig. 10 is a transverse sectional view on the line 10 of Fig. 9.

Figure 8:
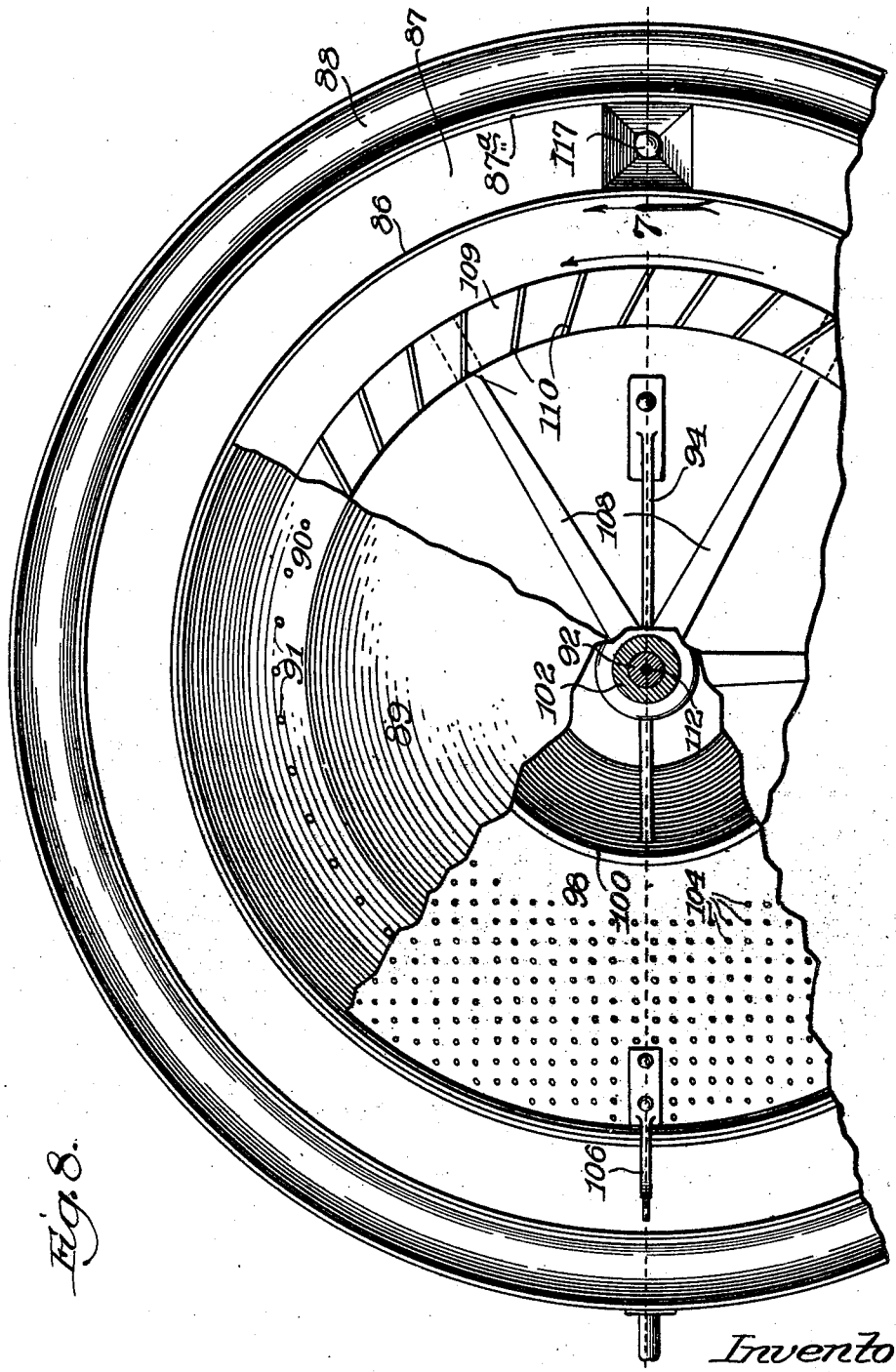
Fig. 8 is a broken plan view, partly in section, of the separating device of Fig. 7.

Referring more particularly to Fig. 1 of the drawings, the numeral 20 indicates a receiving and dividing table, which receives the stream of water containing debris or fine waste material below one-sixteenth to one-twentieth mesh, from a phosphate washing process, preferably, extremely fine material, say below 150 or 200 mesh, is discarded. This table, which has a sufficient slope to permit a flow of the stream of sufficient rapidity to prevent deposition of solids, say about one inch to the foot, receives the stream of debris and divides it into a considerable number of smaller streams, which are received by a depositing table 21, suitably of the general character of that shown in my prior Patent No. 1,723,190, granted August 6, 1929.

The division of the stream on the table 20 is preferably so effected that the divided streams will be substantially equal in volume and in content of material carried. In the form shown, this is accomplished by successive halving of the stream.

Thus, the table 20 receives the entire stream of debris, which may be flowing at the rate of about 5000 gallons per minute, at its receiving end 22. A partition 23 divides the stream into halves, the movable point 24 being set to secure equal division. Each half is then divided into two equal streams by a partition 26 provided with a suitably set, movable point 27. Each of the four resulting streams is then divided into two equal streams in a similar manner by the partitions 29, each provided with similarly movable points 30. In this manner, the entering stream of debris may be divided into any desired number of equal smaller streams. Although division by halves has been illustrated in the particular form shown in the drawings, it is readily apparent that the division may be effected in any desired number of aliquot proportions simultaneously or successively.

The divided streams of debris are received by the settling table 21, divided by the vertical partitions or strips 31 into a suitable number of narrow, elongated separating channels or zones, of the character set forth in my prior patent above referred to. The initial slope of this table is such as to secure the desired sedimentation of the debris or sands carried by the streams of liquid, except the excessively fine material of above 150 mesh, suitably one-eighth to one-fourth inch per foot. In the form illustrated, the table 21 is pivotally mounted on a horizontal axis 32 on a suitable support or tressel 33, being mounted in such manner that the forward or receiving end is normally somewhat overbalanced to facilitate dumping. It is held in its desired relation to the distributing table 20 by any suitable means, for example, by a spiral spring 34, one end of which is secured to a support 35 mounted on the distributing table 20, and the other end of which is hooked to a bail 36 attached to the forward end of the separating or settling table 22.

When the device is in operation, as the debris or sands from the divided streams from the distributing table 20 deposit on the table 21, the greater portion thereof is deposited at the forward end of the table, and the weight of the deposited material, partially counterbalanced by the spring 34, permits a sufficient depression of the forward end of the table to maintain the desired slope at the surface of the deposited material. When the desired quantity of the material has been deposited upon the settling table 21, the stream of debris is temporarily halted, the spring 34 unhooked from the bail 36, and the forward end of the depositing table permitted to drop, as shown in dotted lines in Fig. 1, to dump the debris or sands into the pit 37. In this way a substantially complete separation of the debris or sands from the stream of water and excessively fine material or mud can be secured, the deposited and dumped material containing about 30% of water, and in a typical instance, about 26% of phosphate of lime (B. P. L.).

The deposited debris and sands are withdrawn from the pit 37 by a conveyor 38 and discharged into a hopper 39, from which it is fed to a suitable rubbing or attrition device, of the general character of that illustrated in my prior Patent 1, 741,063.

In the rubbing or attrition device, the particles of debris are thoroughly rubbed against each other in the presence of a relatively small amount of water for cleaning purposes and additional water may be supplied if desired. As a result of the cleaning effected in this operation in the subsequent treatment with oil, much smaller proportions of oil and of emulsifying agents may be employed than would otherwise be possible.

After rubbing or attrition, the material is taken to a mixer 50 in which it is mixed with additional water.

After this, the cleaned material is preferably reduced to a water content in the order of 50 to 70%, and is then ready for treatment for the separation of the phosphate and silicia portions thereof.

After the debris or phosphate mineral has been cleaned by rubbing or other suitable means, I mix therewith a minute quantity of oil, preferably in the form of an emulsion. By such admixture, the individual mobility of the phosphate particles appears to be increased without affecting the packing tendency of the silicious particles. The phosphate particles acquire a granular character, and settle out as a fairly distinct stratum on the packed sands under the conditions hereinafter set forth. To some degree, a similar action can be secured by oil-treating the material without rubbing or cleaning, but much larger proportions of oil and emulsifying agents are required.

I find that the oil is best admixed with and utilized by the phosphate debris when preliminarily emulsified, suitably with a small amount of soap. This emulsification is suitably effected in an emulsifier 58, which discharges the emulsion into a special form of mixer 59, in which it is mixed with the separated, cleaned debris, received by the mixer 59 from the hopper 60, to which it is transferred from the pit 57 by the conveyor 61.

The emulsifier 58 is formed as an elongated trough, having a section similar to that of the mixer 59, which is shown in transverse section in Fig. 6. The bottom of the trough is of semicylindrical form, and the top of the trough is covered, the cover 62 being formed to provide a plurality of angularly disposed surfaces 63, set to throw forward in the trough or container any material projected upwardly by the stirring action within the emulsifier. The desired stirring is effected by means of a driven stirrer shaft 64 on which are mounted the radial pins 65. The stirrer shaft 64 is journalled at one end in a stuffing box 66 and at the other end in a bearing 67 at the end of the emulsifier 58, where it discharges into the mixer 59. The oil and soap or solution thereof are discharged into the receiving end of the emulsifier, 58, suitably through the pipe 68, and water is discharged thereinto through the pipe 69. The oil, soap and water may be employed in any suitable proportions to secure an emulsion; for example, I have found it satisfactory to use approximately 2% of a suitable oil, such as a heavy fuel oil of a gravity of 14 to 20° A. P. I. and approximately one-third that proportion of soap. Any suitable oil of a vegetable or mineral character or other petroleum oil may be employed; for example, I have successfully employed fatty oils, such as cotton seed oil and light oils such as kerosene. However, as will be hereinafter more fully explained, I prefer to employ a mineral oil of as high specific gravity as is practicable.

The stirrer shaft 64 is rotated at a high speed, say 600 revolutions per minute or higher, to effect thorough intermixture of the oil, soap and water and to produce an emulsion thereof. This emulsion discharges directly into the mixer 59, which is of similar construction to the emulsifier 58, but larger in cross section. It is similarly provided with a cover plate 70, made up of a series of angularly disposed portions 71, which are arranged so as to throw forward and advance any material carried upwardly in the mixer by the action of the stirrer. A rotatable stirrer shaft 72 is mounted therein, being supported at one end in a stuffing box 73 and at the other end in the bearing 67. The stirrer shaft 72 is provided with radial arms 74.

The cleaned sand or debris is discharged from the hopper 60 into the receiving opening 75 of the mixer 59, which is disposed so that the phosphatic sand is received by the mixer at substantially the point of entrance of the emulsion from the emulsifier 58. The relative proportion of the phosphatic sand mixture and the emulsion may be quite widely varied; for example, from two to ten parts of the former to one of the latter. With an emulsion such as has been hereinbefore described, I have found five parts of the phosphate material to one part of the emulsion to be satisfactory, this providing approximately 0.4% of oil relative to the phosphate material or 0.3 to 1% of oil and from 0.1 to 0.2% of soap based on the solid contents of the phosphatic material received, which may be from 40 to 60% water. Larger proportions may be employed, if desired, providing no buoyant effect tending to carry the particles to the surface is exerted, or smaller proportions with lower proportions of phosphate in the material under treatment.

In the mixer 59 the phosphatic material and the emulsion are thoroughly mixed. However, since any breaking down or crushing of the phosphatic material is undesirable and leads to a loss thereof by a possible floating action, I prefer to operate the stirrer 72 at a slower rate of rotation than the stirrer 64 in the emulsifier 58. 250 to 400 revolutions per minute has been found to be satisfactory.

The mixture discharges from the mixer 59 through the conduit 76 and is then subjected to a separating action. Although this may be accomplished in one or more stages, and in a number of ways by devices causing a relative movement between the treated phosphatic material and a body of water, I prefer to effect it in a plurality of stages, in the first of which the phosphatic material is separated from the greater portion of the silicious material, the remainder of the silicious material being removed in a subsequent stage. In the drawings, I have shown apparatus suitable for such operation.

The initial separation may be effected upon a settling table such as has been hereinbefore described, in which shallow streams of water and the treated phosphatic material are caused to flow along narrow, elongated flumes or passages. In operating in this manner, the oil treated phosphatic material from the mixer 59, discharged through the conduit 76, enters the flume 77 together with a stream of water from the pipe 78, the amount of water thus provided being sufficient to bring about a free flowing movement of the treated phosphatic material. Eight to ten times the amount of treated material received from the mixer 59 has been found to be satisfactory.

The flume 77 discharges the stream carrying the treated phosphatic material onto the distributing table 79, which has a sufficient slope, say about one inch to a foot, to prevent settling while the stream of material flows thereover and is divided into a plurality of equal streams, as hereinbefore described in connection with the distributing table 20. The streams then flow across the table 80, which is similar in construction to the settling table 21 and is set at a suitable slope to permit the differential collection of the silicious material; a suitable slope being three-eighths to one-half inch per foot. In passage over the settling table 80, although both the phosphatic and silicious constituents of the treated material are carried along at the bottom of the narrow, shallow streams of water, the silicious material tends to pack and accumulate, while the phosphatic material, by its greater mobility, is rolled along the bottom of the stream of water and ultimately discharges with the latter. The streams of water may suitably be one-quarter inch deep or less. As a result, the greater portion of the silicious material contained in the treated phosphatic material accumulates on the forward portion of the settling table 80, and when the accumulation is sufficient, may be dumped, as at 81. This deposited sand is a clean, white material, very low in phosphate, ordinarily containing only from 0.5 to 1% phosphate of lime. A small amount of silicious material is discharged from the end of the table with the phosphatic material. The latter, if recovered at this stage, would show a silica content of 9 to 10%. In many cases, this is an adequate separation of the phosphatic and silicious material. However, I have found that, by proceeding further as hereinafter described, the greater portion of the remaining silicious material can be removed.

The separated water stream discharged from the end of the settling table 80 and carrying with it the phosphate rock with a low percentage of silica is received in a trough 82, which discharges through a flume 83 into a further separating device, by which residual silicious material is removed.

This device likewise depends for its effectiveness on the difference in mobility and in sedimentation between the silicious material and the phosphatic material, as enhanced by the treatment with oil. Several different forms of separator may be employed, of which one, shown diagrammatically in Fig. 1, and designated by the numeral 84, is shown on an enlarged scale in Figs. 7 and 8. In this form of separator, the mass of phosphate rock is subjected to a stirring or combing action while maintained below the level of a body of liquid. As a result of the tendency of the silicious material to pack and accumulate, and of the phosphatic material to move with the motion of the body of water, created by the stirring or combing elements, the silicious material is caused to accumulate in one portion of the apparatus and the phosphatic material in another. The action will be more fully understood on reference to the drawings, and more particularly to the enlarged drawings Figs. 7 and 8.

The body of the separator is formed as an inverted cone 85, the outer edge of which is surrounded by a cylindrical wall 86, which serves as the inner wall of an annular trough 87. The outer cylindrical wall 87ᵃ of the trough 87 extends vertically to a higher elevation than the inner wall 86, and in turn is surrounded by an annular discharge trough 88.

Within the inner wall 86 of the annular trough 87 there is provided at some distance above the inverted conical shell a receiving pan 89, provided with a depressed portion 90, annular in shape, near its outer margin, the bottom of the pan sloping upwardly from the annular depressed portion 90 on both sides. Small openings 91, arranged in a circle, are provided in the depressed annular portion 90 as an outlet for silicious material, as hereinafter set forth.

A vertical shaft 92 is mounted centrally of the inverted conical shell 85, its lower end being journalled in thrust bearing 93 in a spider 94 secured to the shell 85. The upper end of the shaft 92 is journalled at an intermediate point in a bearing 95 on an arm 96 secured to the standard or support 97.

Above the receiving pan 89 there is provided a revolving circular plate 98 having a central opening 99 through which passes material discharged into the separating device through the inverted conical hopper 100 which is secured to or formed integral with the circular plate 98. By means of a spider 101, the circular plate 98 and receiving hopper 100 are mounted on a sleeve 102, which is journalled on the shaft 92 and is driven from the pulley 103. Thus the circular plate 98 may be rotated at any convenient speed. It is provided with depending pins 104 which extend down into the mass of material contained in the receiving pan 89. A plow 105, which travels in the trough 87, is likewise carried by the circular plate 98 by means of a curved arm 106.

Below the rotating sleeve 102, which rotates independently of the movement of the shaft 92, the latter carries and is journalled in a rigid sleeve 107, to which the inner edge of the receiving pan 89 is secured. Below this, a spider 108 is keyed to the shaft 92 and rotates therewith. The spider 108 carries at its outer margin a flat ring 109 directly below the annularly depressed portion 90 of the receiving pan 89 and spaced a slight distance therefrom. The ring 109 carries on its upper surface a plurality of spaced ribs 110, disposed at an angle to the radius of the ring. The ring 109 and spider 108 are rotated with the shaft 92, which is suitably driven, as by a pulley 111 at its upper end.

The shaft 92 is bored, and through it passes a valve stem 112, which terminates in a conical valve 113, which closes an opening at the apex of the inverted conical shell 85. The valve stem 112 and valve 113 are operated to open and close this opening by means of a hand lever 114 or by any suitable device. On opening the valve, material in the conical shell 85 is discharged to a conduit 115.

At one point in its periphery, the trough 87 is provided with a discharge spout 116 closed by a cone valve 117 mounted on a valve stem 118, which is operated vertically to close or open the valve by means of a hand lever 119 or other suitable device.

In the operation of the separator, the separated phosphatic material from the table 80, discharged into the trough 82, and which is mixed with a large quantity of water, suitably 10 to 15 parts, passes down the flume 83 and discharges into the hopper-like opening 100 centrally of the rotating circular plate 98, and is retained in the receiving pan 89. A water level up to or higher than the outer cylindrical wall 87ᵃ of the trough 87 is maintained in the separator, so that the material in the receiving pan 89 below the circular plate 98, as well as the latter plate itself, are completely immersed in water.

The plate 98 is rotated at a moderate rate of speed; for example, for a plate ten feet in diameter, three revolutions per minute has been found to be satisfactory, this giving a peripheral speed of about 100 feet per minute. The depending pins 104 pass like the teeth of a comb through the phosphate material in the receiving pan 89 and exert a gentle stirring action, which brings into evidence the collecting and packing tendency of the silicious material. It likewise causes a general movement of the liquid, and the mobility of the phosphate particles causes them to move to a certain extent with the liquid. As a result of this action, the residual silicious material tends to pack and accumulate in the depressed portion of the receiving pan, in which the small openings 91 are provided. The separated silicious material tends to flow out slowly through these openings, and the slowly rotating ring 109, which is spaced only a short distance below the depressed portion 90 of the receiving pan to prevent free flow of material through the openings, removes the silicious material and diverts it outwardly by the action of the ribs 110. The silicious material is thus discharged into the shell 85, finds its way to the apex thereof, and may be discharged into the conduit 115 by opening the valve 113.

The accumulating mobile phosphatic material in the receiving pan 89, is carried by the gentle movement of the depending pins 104 and the flow of liquid over the lower, inner wall 86 of the trough 87, in which it settles out, and is pushed by the plow 105 to the discharge 116, from which it may be removed by depressing the conical valve 117.

The excess water overflows into the trough 88 and is discharged through the pipe 120.

Any suitable apparatus may be employed for removing the soap and oil from the phosphate rock. Such apparatus is suggested at 122 in Fig. 1.

Figs. 9 and 10 illustrate an alternative device which may be employed for the separation of the silicious and phosphatic constituents of the sands or debris. Such a device may be employed, for example, in place of the separating table 80, or preferably in place of the separator 84, which receives the phosphatic material from the table 80 and removes the residual silicious material therefrom.

The operation of the separator of Figs. 9 and 10 depends upon the discovery which I have made that, when the oil-treated phosphatic debris is agitated under water on the surface of a screen or the screen agitated to produce relative motion with respect to the material, not only does the silicious portion tend to pack and accumulate, but also to pass through the screen, whereas the phosphatic constituents move with the motion of the water and of the screen, and do not pass through the screen, though of such size that, if dry, they would pass through the screen.

In the form shown in Figs. 9 and 10, the separator is housed in a container 135, suitably of wood and provided with a sloping bottom 136. Within the container 135 is mounted a cylindrical screen 137 arranged at a slight inclination to the horizontal, say with a downward slope of about two inches per foot. The screen of the cylinder may be, for example, 16 mesh or smaller, depending upon the fineness of the material say about 24 mesh. It may suitably be supported in flanges in the sheave rings 138 and 139, which are suspended by the cables 140 from the sheaves 141 and 142 respectively. The latter are mounted upon a power-driven shaft 143 parallel to the axis of the cylinder 137, so that on rotation of the shaft 143, the cylinder 137 is likewise rotated.

The sheave ring 138 at the receiving end of the cylinder 137 is provided with an outwardly projecting receiving trunnion 144, which passes through an opening in the end wall of the container 135. This receives the material to be treated, through the flume 83ª.

The sheave ring 139 at the exit end of the screen cylinder 137 may suitably rest in a stirrup formed in a partial partition 145, by which the lower portion of the container 135 is divided into two sections; a larger section which receives the material passing through the screen cylinder and a smaller section which receives the material discharged from the end of the screen cylinder. Separate valved outlets 146 and 147 are provided respectively for these sections of the container.

The material delivered to the screen separator through the flume 83ª may suitably contain from 12 to 14% silica on a dry basis. The amount of water delivered will be from ten to twelve times the amount of solids. This mixture is discharged through the trunnion 144 into the interior of the cylinder, which is given a slow rotation, as indicated by the arrow in the section shown in Fig. 18. The rotation of the screen cylinder causes a gentle movement of the material along the bottom of the screen, the general position of the material being indicated at 148. This movement of the material is entirely under water, the level of which is determined by the overflow 149.

In the operation of the cylinder, the sand sifts down and collects on the screen ad passes through the latter, whereas the gentle agitation causes the gradual movement of the phosphatic material out of the end of the screen cylinder and into the smaller compartment in the container, from which it may be removed through the valved outlet 147. The agitation may be increased mechanically, if desired. The sands separated in this manner may contain a small proportion of phosphatic material, and if necessary, this sand and phosphatic material may be put through the device the second time.

When fouling or clogging of the screens with oil occurs, they may be cleared by any suitable means; for example, with kerosene or other light oil or mechanically, by a pressure spray of water, or the like.

The separated phosphatic material derived by the operation of this process has a silica content of 7 to 7½% or less and, in the operation described, consists entirely of material hitherto wasted as the debris of the usual phosphate washing processes. In amount, it is approximately one-half of that recovered in the usual phosphate washing process, and consequently the process constitutes a valuable and important addition to the usual phosphate washing process. In the operation of the present process, by taking advantage of the differential or selective packing tendency and mobility of the constituents of the phosphate debris, I am enabled to reduce the mechanical handling and chemical treatment of the materials to a minimum.

The various separating devices which I have described for the separation of the silicious and phosphatic constituents of the treated phosphate debris may be used interchangeably, although I prefer to employ a settling table such as the table 80 for a first or preliminary separation, and an agitating separator, such as the device of Figs. 7 and 8 or a screen separator, such as the device of Figs. 9 or 10, for a final stage of separation. The entire separation may, however, be accomplished by the use of any one of these types of devices alone, and in many cases an adequate separation can be accomplished in a single stage. In each of the separators herein described, it is important that the operation be conducted with the material below the surface of the water. It is likewise important that excessive mechanical action or abrasion be avoided, in order to avoid the formation of excessively fine particles of material, which might have a tendency to float and be wasted with the overflow water in the various steps of the process; and likewise to avoid any such vigorous mechanical action in the separation stages as will have the same tendency.

Although the present invention has been described in connection with the details of operations and of apparatus, it is not intended that these details shall be regarded as limitations upon the scope of the invention, except in so far as included in the accompanying claims.

I claim:

1. The method of recovering phosphate values from fine mineral phosphates which comprises mixing oil therewith, moving the oil-treated phosphates under water to cause relative movement of the particles thereof, packing and accumulating the silicious constituents of the mineral phosphates, and separating the phosphatic constituents.

2. The method of recovering phosphate values from fine mineral phosphates which comprises cleaning the mineral phosphates to remove superficial bonding material therefrom, mixing the cleaned phosphates with a minute proportion of oily material, moving the cleaned phosphates under water, thereby causing relative movements of the particles thereof, packing and accumulating the silicious constituents of the phosphates, and separating the phosphatic constituents.

3. The method of recovering phosphate values from fine mineral phosphates which comprises subjecting the mineral phosphates to attrition, thereby removing adherent bonding material from the surfaces of the particles thereof, separating the removed bonding material from the cleaned particles, incorporating a minute amount of oil with cleaned phosphate mineral, moving the treated mineral under water, thereby imparting relative motion to the particles of the mineral, packing and accumulating the silicious constituents thereof, and separating the mobile phosphatic constituents.

4. The method of separating the silicious and phosphatic constituents of fine mineral phosphates which comprises incorporating a minute proportion of oil therewith, agitating the oil treated mineral phosphates below the surface of the water, whereby relative movement is imparted to the particles of the mass of the material while setting the water in motion, packing and accumulating the silicious constituents of the phosphates, moving the phosphatic constituents with the water and below the surface thereof, and effecting separation of the phosphatic constituents by such movement.

5. The method of separating the silicious and phosphatic constituents of fine mineral phosphates which comprises incorporating a minute proportion of oil therewith, moving a mass of the oil treated mineral phosphates below the surface of a body of water while causing flow of the water with said body in a desired general direction, packing and accumulating the silicious constituents of the mineral, moving the phosphatic constituents below the surface of the water, in the general direction of flow thereof, and separately depositing the phosphatic constituents.

6. The method of separating the constituents of fine mineral phosphates which comprises incorporating a minute proportion of oil therewith, flowing the oil treated mineral phosphates in a shallow stream of water through an elongated conduit, packing and accumulating the silicious constituents of the mineral along the bottom of the conduit, and moving the phosphatic constituents along said conduit under the surface thereof in the direction of flow of the stream.

ARTHUR J. MASON.